United States Patent
Fujita et al.

(10) Patent No.: US 8,073,889 B2
(45) Date of Patent: *Dec. 6, 2011

(54) SEED GENERATING CIRCUIT, RANDOM NUMBER GENERATING CIRCUIT, SEMICONDUCTOR INTEGRATED CIRCUIT, IC CARD, AND INFORMATION TERMINAL EQUIPMENT

(75) Inventors: Shinobu Fujita, Kanagawa-ken (JP); Tetsuro Iwamura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 833 days.

This patent is subject to a terminal disclaimer.

(21) Appl. No.: 12/153,410

(22) Filed: May 19, 2008

(65) Prior Publication Data

US 2008/0270501 A1 Oct. 30, 2008

Related U.S. Application Data

(63) Continuation of application No. 10/761,326, filed on Jan. 22, 2004, now Pat. No. 7,395,288.

(30) Foreign Application Priority Data

Jan. 29, 2003 (JP) ................................. 2003-019732

(51) Int. Cl.
*G06F 7/02* (2006.01)

(52) U.S. Cl. ........................................................ 708/251

(58) Field of Classification Search .................. 708/251, 708/254
See application file for complete search history.

(56) References Cited

U.S. PATENT DOCUMENTS

| 6,285,761 | B1 | 9/2001 | Patel et al. |
| 6,571,263 | B1 | 5/2003 | Nagai |
| 6,631,390 | B1 | 10/2003 | Epstein |
| 2003/0037079 | A1 | 2/2003 | Wilber |
| 2004/0107229 | A1 | 6/2004 | Remi |

FOREIGN PATENT DOCUMENTS

| JP | 3-204721 | 9/1991 |
| JP | 2000-276330 | 10/2000 |
| JP | 2002-215030 | 7/2002 |

OTHER PUBLICATIONS

Patent Abstracts of Japan, JP 2002-215030, Jul. 31, 2002.

*Primary Examiner* — Tan V Mai
(74) *Attorney, Agent, or Firm* — Oblon, Spivak, McClelland, Maier & Neustadt, L.L.P.

(57) ABSTRACT

A random number generating circuit comprises: the seed generating circuit which generates a seed; and a pseudo random number circuit which generates pseudo random numbers based on the seed generated by the seed generating circuit. The seed generating circuit has: an oscillating circuit which oscillates continuously or intermittently, and which outputs a digital data sequence; a smoothing circuit which outputs time series data by controlling appearance frequencies of "0" and "1" in the digital data sequence outputted from the oscillating circuit; and a postprocessing circuit which generates one-bit seed by a computation using a plurality of bits included in the time series data.

10 Claims, 15 Drawing Sheets

If X1=X2,
an operation equivalent to a flip-flop having even inverters
  In the case of Z=1
    · when X1=X2, Q1=0, Q2=0
    · when X1=X2=0, Q1=1, Q2=0
  In the case of Z=0
    · when X1=X2, Q1=1, Q2=1
    · when X1=X2=0, Q1=1, Q2=0

If X1≠X2,
an operation as a ring oscillator

SEED GENERATING CIRCUIT, RANDOM NUMBER GENERATING CIRCUIT, SEMICONDUCTOR INTEGRATED CIRCUIT, IC CARD, AND INFORMATION TERMINAL EQUIPMENT

CROSS-REFERENCE TO RELATED APPLICATIONS

This application is a continuation of U.S. application Ser. No. 10/761,326, filed Jan. 22, 2004 which is based upon and claims the benefit of priority from Japanese Patent Application No. 2003-019732, filed on Jan. 29, 2003; the entire contents of each of which are incorporated herein by reference.

BACKGROUND OF THE INVENTION

The present invention relates to a seed generating circuit, a random number generating circuit, a semiconductor integrated circuit, an IC card, and an information terminal equipment, and more particularly, it relates to a seed generating circuit compactly constructed with a digital logic circuit, capable of generating random numbers with high randomness, and suitable for use in cryptographic algorithm, integrated circuit using the seed generating circuit, an IC card using the seed generating circuit, and an information terminal equipment using the seed generating circuit.

In use of a random number sequence for simulation of a phenomenon accompanied by a probability process or for a security purpose, not only the randomness in a time-sequence but also the randomness in a data sequence acquired by arranging data taken from the random number sequence by using same system clock is important. It is because the random number is used for the method of preventing cryptographic information from being read-out by sampling many data with same system clock, by carrying out computation of the cryptographic data and the random number which were read by sampling many data with same system clock.

A pseudo random number generating circuit is comparatively small. Moreover, the data of a time-sequence acquired by the pseudo random number generating circuit can be used as a random number with comparatively high quality. However, the random number with high quality cannot be obtained in the data sequence made by arranging data taken with a same system clock in a way like first, second, . . . after switching on the power supply of the system.

FIG. 15 is a schematic diagram for explaining this situation. Supposing, the random number sequence is generated by outputting "0" and "1" time-sequentially, whenever the system including the pseudo random number generating circuit is turned ON. Then, the randomness taken along the time-sequence (along the horizontal direction in this figure) is good. However, the randomness taken along the data sequence obtained by sampling data with a same system clock from these random number sequences, (along the vertical direction in this figure) is not always good. For example, the problem that the appearance frequency of one of "0" and "1" is higher than that of the other in the same system clock data sequence arises, as illustrated in FIG. 15. This is because the random number sequence is determined depending on the "initial value" i.e., "seed" of the pseudo random number circuit in the case of the pseudo random numbers.

FIG. 16A through FIG. 16C are schematic diagrams for explaining a role of the seed in the pseudo random number circuit. FIG. 16A expresses the circuit provided the linear feedback shift register of an example of the pseudo random number circuit. In this circuit, data X is outputted one by one in response to the inputted seed. However, if the seed inputted is fixed, the random number sequences (sequence of the horizontal direction in this figure) obtained are also the same. Therefore, the same system clock data sequences (vertical direction in this figure) obtained by sampling data of the same system clock from these random number sequences have always the same order.

Even if a certain circuit which has a role of "disturbing" this sameness is provided, the same system clock data sequence cannot easily become the random number with high quality. That is, even if the seed inputted is rewritten each time, the balance of "0" and "1" shifts from 1:1, or a certain regularity and periodicity exist in many cases, as expressed in FIG. 16C. This is because the randomness of the same system clock data sequence obtained by the pseudo random number circuit depends only on the randomness of the inputted seed. That is, the randomness of the inputted seed becomes very important in the case of the pseudo random number circuit.

Although there are many cases where seed is rewritten by using appropriate software at the time of starting the system, it is almost impossible to give seed the always different randomness by this rewriting. For example, the method that "a sample data is obtained by extracting a part of unreproducible information which changes irregularly over time among the state information generated by the functional media of a mobile terminal. The sample data is inputted into the random number generating part 103 as the seed 102, and a random number 104 is generated." is disclosed in Japanese Patent Laid-Open Publication No. 2002-215030.

However, even if the sample data itself has the randomness, neither a mechanism with which the balance of "0" and "1" is kept nor a mechanism to preclude periodicity and regularity is not provided in the method disclosed in Japanese Patent Laid-Open Publication No. 2002-215030.

On the other hand, a mechanism with which the seed is always rewritten at random is required in a pseudo random number circuit. That is, the random seed in which a certain randomness which appears in a hardware is used, the balance of "0" and "1" does not shift from 1:1, and there is no regularity and periodicity is required.

There is a method of generating a seed by using the random number generated by the random signal generated by pure physical phenomena such as a thermal noise. However, since the circuit generally becomes large by this method, it is difficult to integrate the circuit in small systems such as a semiconductor integrated circuit, an IC card and various kinds of information terminal equipment, for example.

SUMMARY OF THE INVENTION

According to an aspect of the invention, there is provided a seed generating circuit comprising: an oscillating circuit which oscillates continuously or intermittently, and which outputs a digital data sequence; a smoothing circuit which outputs time series data by controlling appearance frequencies of "0" and "1" in the digital data sequence outputted from the oscillating circuit; and a postprocessing circuit which generates one-bit seed by a computation using a plurality of bits included in the time series data.

According to other aspect of the invention, there is provided a random number generating circuit comprising: the seed generating circuit which generates a seed; and a pseudo random number circuit which generates pseudo random numbers based on the seed generated by the seed generating circuit, the seed generating circuit having: an oscillating circuit which oscillates continuously or intermittently, and which outputs a digital data sequence; a smoothing circuit which outputs time series data by controlling appearance frequencies of "0" and "1" in the digital data sequence outputted from the oscillating circuit; and a postprocessing circuit which generates one-bit seed by a computation using a plurality of bits included in the time series data.

According to other aspect of the invention, there is provided a semiconductor integrated circuit comprising a random number generating circuit having: the seed generating circuit which generates a seed; and a pseudo random number circuit which generates pseudo random numbers based on the seed generated by the seed generating circuit, the seed generating circuit having: an oscillating circuit which oscillates continuously or intermittently, and which outputs a digital data sequence; a smoothing circuit which outputs time series data by controlling appearance frequencies of "0" and "1" in the digital data sequence outputted from the oscillating circuit; and a postprocessing circuit which generates one-bit seed by a computation using a plurality of bits included in the time series data.

According to other aspect of the invention, there is provided an IC card comprising a semiconductor integrated circuit including a random number generating circuit having: the seed generating circuit which generates a seed; and a pseudo random number circuit which generates pseudo random numbers based on the seed generated by the seed generating circuit, the seed generating circuit having: an oscillating circuit which oscillates continuously or intermittently, and which outputs a digital data sequence; a smoothing circuit which outputs time series data by controlling appearance frequencies of "0" and "1" in the digital data sequence outputted from the oscillating circuit; and a postprocessing circuit which generates one-bit seed by a computation using a plurality of bits included in the time series data.

According to other aspect of the invention, there is provided an information terminal equipment comprising the semiconductor integrated circuit including a random number generating circuit having: the seed generating circuit which generates a seed; and a pseudo random number circuit which generates pseudo random numbers based on the seed generated by the seed generating circuit, the seed generating circuit having: an oscillating circuit which oscillates continuously or intermittently, and which outputs a digital data sequence;

a smoothing circuit which outputs time series data by controlling appearance frequencies of "0" and "1" in the digital data sequence outputted from the oscillating circuit; and a postprocessing circuit which generates one-bit seed by a computation using a plurality of bits included in the time series data.

BRIEF DESCRIPTION OF THE DRAWINGS

The present invention will be understood more fully from the detailed description given herebelow and from the accompanying drawings of the embodiments of the invention. However, the drawings are not intended to imply limitation of the invention to a specific embodiment, but are for explanation and understanding only.

In the drawings.

DETAILED DESCRIPTION

Referring to drawings, some embodiments of the present invention will now be described in detail.

Figure 1:
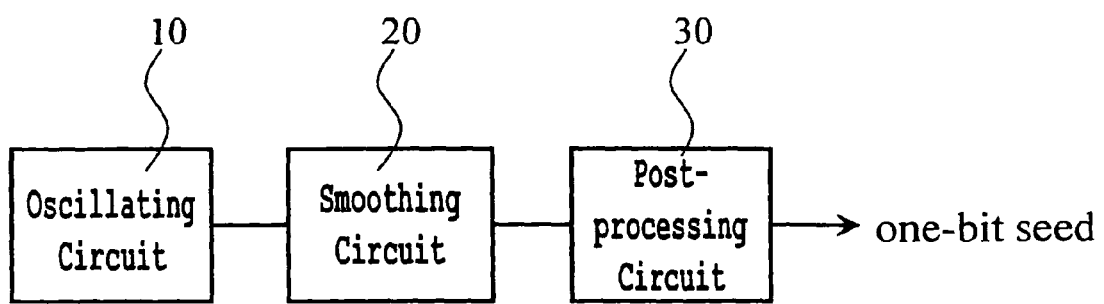
FIG. 1 is a block diagram showing the composition of the principal part of the seed generating circuit according to the embodiment of the invention.

FIG. 1 is a block diagram showing the composition of the principal part of the seed generating circuit according to the embodiment of the invention. That is, the seed generating circuit of this embodiment includes an oscillating circuit 10 and a smoothing circuit 20.

The oscillating circuit 10 is a circuit which generates a random signal by oscillating continuously or intermittently (discontinuously). When the random signal is made by using the oscillation, the circuit can be miniaturized easily. The smoothing circuit 20 is a circuit which maintains the balance between "0" and "1" of the random signal outputted from the oscillating circuit 10, and disturbs the periodicity and regularity of them. In such structure, the balance between "0" and "1" can be serially made uniform. And, a one-bit random seed for the pseudo random numbers can be generated by predetermined computation using many bits generated serially.

Figure 2:
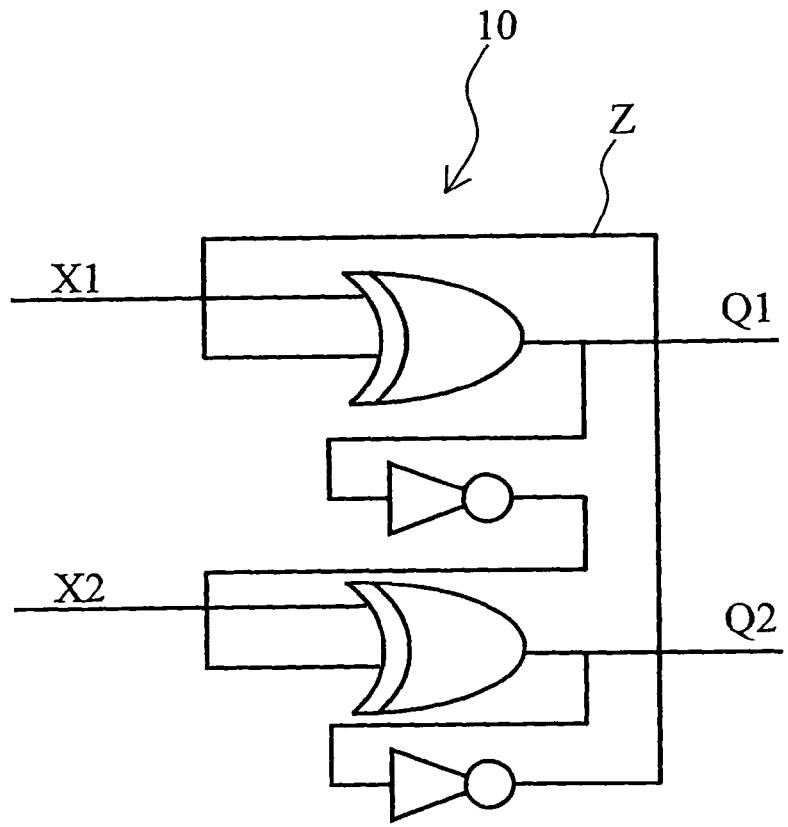
FIG. 2 is a schematic diagram showing the example of the oscillating circuit 10.

FIG. 2 is a schematic diagram showing the example of the oscillating circuit 10. That is, the oscillating circuit of this example gives two outputs Q1 and Q2 in response to two inputs X1 and X2. When the two inputs X1 and X2 are same, the oscillating circuit of this example performs an operation equivalent to a flip-flop having even inverters. On the other hand, when the two inputs X1 and X2 are different from each other, the oscillating circuit of this example performs as a ring oscillator. Therefore, if the case where the two inputs X1 and X2 are the same and the case where the values of two inputs X1 and X2 are different from each other are evenly probable, the oscillating circuit of this example oscillates for half of the operation period.

Furthermore, the outputs of the circuit expressed in FIG. 2 change corresponding to the value of the initial value Z, unlike a simple oscillating circuit. That is, in the case where the initial value Z is "1", both of outputs Q1 and Q2 become "0" when the inputs X1 and X2 are "1", and the output Q1 becomes "1" and the output Q2 becomes "0" when the inputs X1 and X2 are "0".

On the other hand, in the case where the initial value Z is "0", both of outputs Q1 and Q2 become "1" when the inputs X1 and X2 are "1", the output Q1 becomes "0" and the output Q2 becomes "1" when the inputs X1 and X2 are "0".

Thus, it can be said that the oscillating circuit 10 of the example expressed in FIG. 2 is "intermittent oscillating circuit" in the respect that the circuit oscillates only when two inputs X1 and X2 are different from each other. One of the weak points of a continuous oscillating circuit is that the periodicity tends to remain in an obtained random number data, and that consumption current is large. The intermittent oscillating circuit is a circuit which is improved in these weak points.

Figure 3:
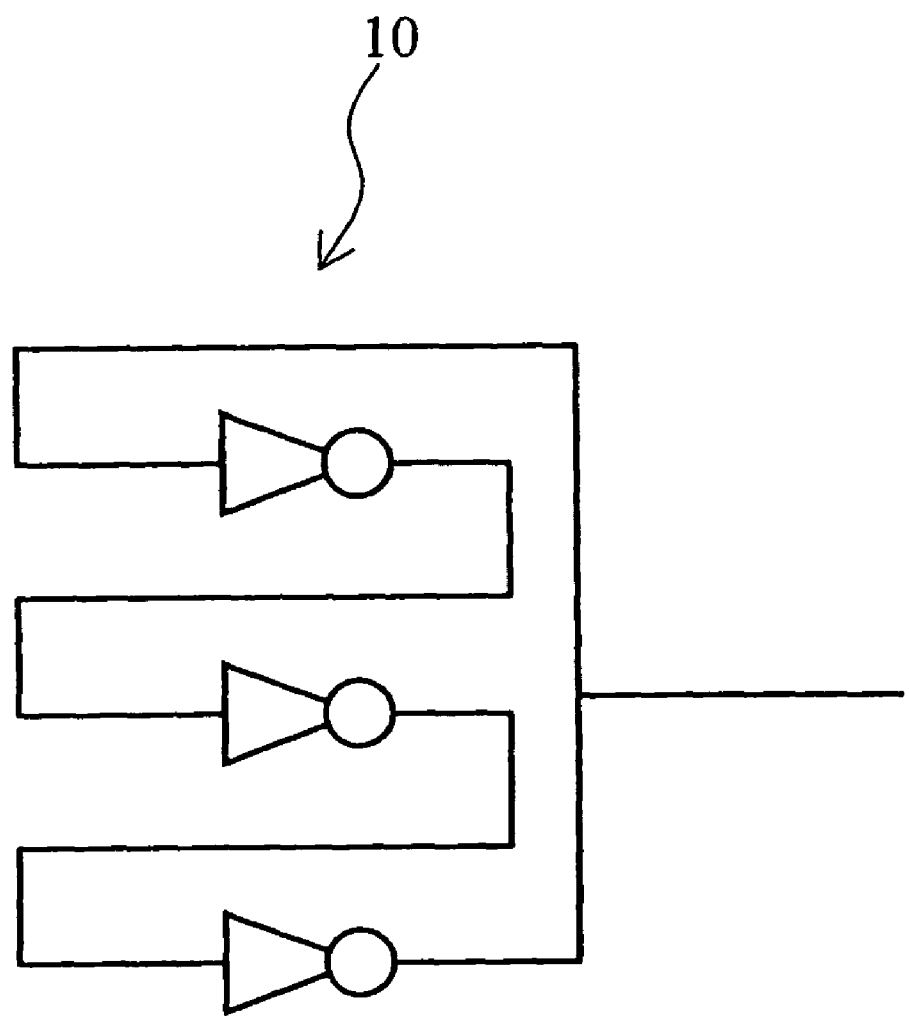
FIG. 3 is a schematic diagram showing another example of the oscillating circuit 10.

FIG. 3 is a schematic diagram showing another example of the oscillating circuit 10. That is, the oscillating circuit of this example is the ring oscillator in which three inverters are connected in series and can be called "continuous oscillating circuit". In this case, it is desirable for the oscillation frequency to be more than 10 times of a system clock in general.

Next, the smoothing circuit 20 in the invention will be explained.

Figure 4:
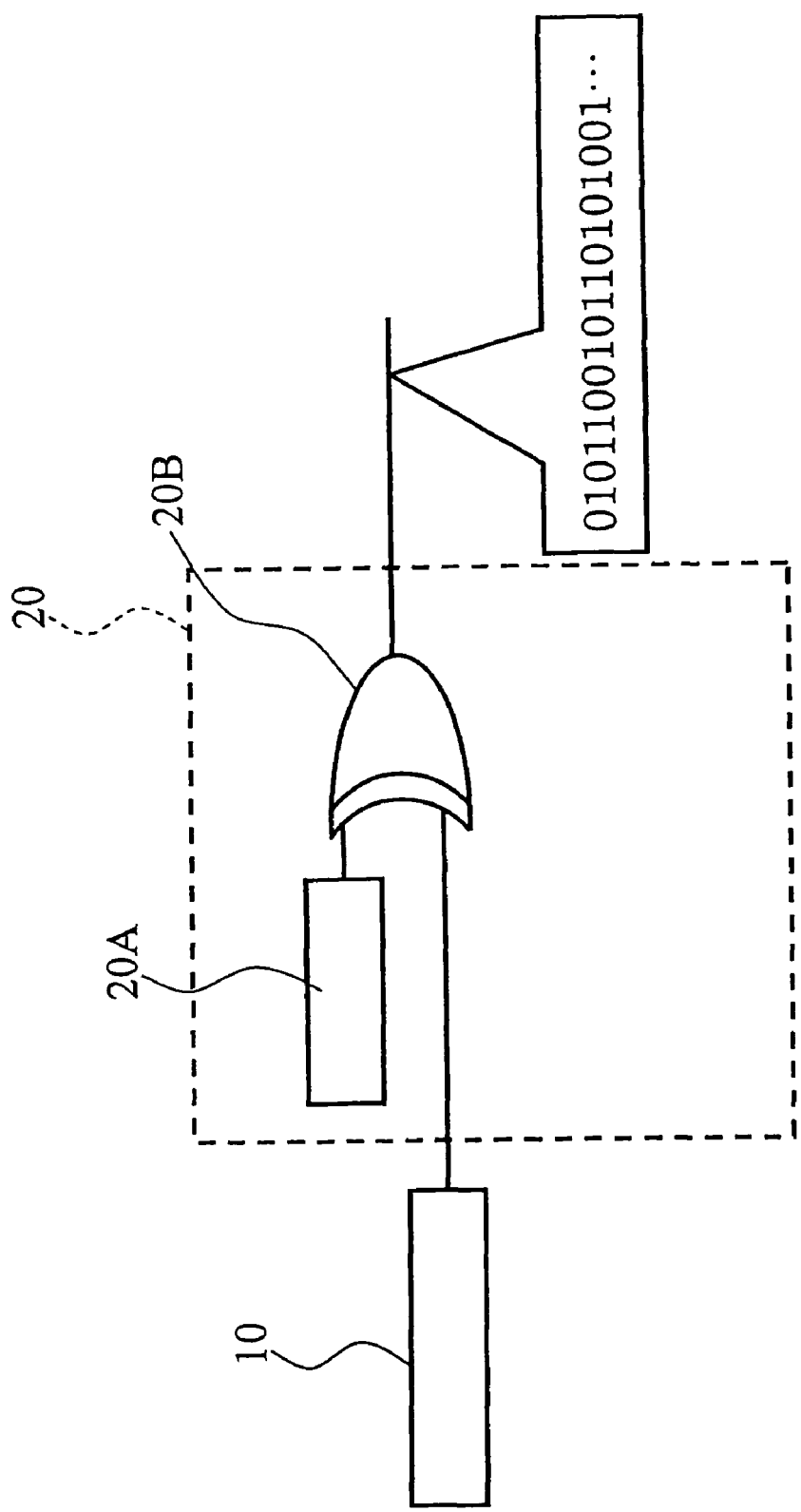
FIG. 4 is a block diagram showing the fundamental composition of the smoothing circuit 20 in the invention.

FIG. 4 is a block diagram showing the fundamental composition of the smoothing circuit 20 in the invention. That is, the smoothing circuit 20 includes the pseudo random number output circuit 20A and the XOR (exclusive OR) operation circuit 20B. As the pseudo random number output circuit 20A, a linear feedback shift register (LFSR) can be used, for example.

Thus, the equality of the random signal can be remarkably improved by calculating XOR (exclusive OR) of the random signal obtained from the oscillating circuit 10, and the pseudo random numbers output. However, it is desirable that the outputs of the oscillating circuit 10 and pseudo random numbers output 20A do not have correlativity, in this case. Hereafter, this point will be explained in full detail.

First, let the outputs from two independent circuits be Q1 and Q2, respectively. Suppose that there is no correlation between Q1 and Q2. Further, let the appearance ratio of "1" in Q1 be p, and let the appearance ratio of "1" in Q2 be q. Then, the appearance ratio r of the output R obtained by operating XOR on Q1 and Q2 being "1" is given by the following formula.

$$r = p + q - 2pq \quad (1)$$

The difference of the appearance ratio of "1" and "0" in XOR output is given by the following formula.

$$|r-(1-r)| = |(1-2p)(1-2q)| \quad (2)$$

The differences of the appearance ratios of "1" and "0" in the output of Q1 and Q2 are $|1-2p|$ and $|1-2q|$, respectively. Since both p and q are from one to 1 inclusive, the following formula is obtained.

$$|(1-2p)(1-2q)| < |1-2p|, |1-2q| \quad (3)$$

This formula circuit that the difference of the appearance ratios of "0" and "1" becomes smaller after XOR than before XOR, i.e., "unevenness" becomes smaller. Therefore, if a plurality of data are arranged in parallel and XOR is performed, "unevenness" will become smaller than an independent output.

For example, if "unevenness" of an output of at least one circuit is small even if there are many circuits where the outputs are uneven, output having an "unevenness" smaller than the circuit will be acquired.

On the other hand, the case where Q1 and Q2 have correlation will be explained as follows:

Let the outputs from two independent circuits be Q1 and Q2, respectively. Suppose that Q1 and Q2 have correlation for a certain reason. Further, let the appearance ratio of "1" in Q1 be p, and let the appearance ratio of "1" in Q2 be q. In the case where Q1 and Q2 have correlation, the probability of Q2 being "1" when Q1 is "1" is not q but is shifted for $\phi$. The degree of the shift from "1" of $\phi$ corresponds the correlativity.

Thus, the appearance probability is as the followings:
Probability that Q1 is "1" when Q1 is "1" equals to $pq\phi$
Probability that Q2 is "0" when Q1 is "1" equals to $(1-q)\phi p$
Probability that Q2 is "1" when Q1 is "0" equals to $q(1-\phi p)$
Probability that Q2 is "0" when Q1 is "0" equals to $(1-q)(1-\phi p)$ The appearance ratio r of the output R obtained by operating XOR on Q1 and Q2 being "1" (Q1 and Q2 are not equal) is given by the following formula:

$$r = (1-q)\phi p + q(1-\phi) \quad (4)$$

The difference between the appearance ratios of "1" and "0" in output R is acquired by the following formula:

$$|r-(1-r)| = |1-2\phi p| |1-2q| \quad (5)$$

That is, in the case where Q1 and Q2 have the correlation, when XOR of Q1 and Q2 becomes R, the appearance probabilities of Q1 and Q2 being "1" depend not only on p and q but also on the degree of the correlation $\phi$. And when p and q are near "0.5", the appearance probabilities of Q1 and Q2 are expressed by the following formula:

$$|r-(1-r)| = |1-\phi| \quad (6)$$

When there is no correlativity between Q1 and Q2, $\phi$ becomes "1". And the appearance ratios of "0" and "1" become uniform. On the contrary, when the correlation between Q1 and Q2 is strong, and if $\phi$ becomes "0" or about "2", R will almost be altogether set to "1" or "0."

Therefore, when XOR is operated in the smoothing circuit 20, it is required the mechanism with which the two inputs Q1 and Q2 may not have the correlativity. That is, it is desirable that the oscillating circuit 10 and the pseudo random number output circuit 20A may not have the correlativity.

For example, it is desirable not to input the same system clock to these two circuits directly. It is desirable to latch the output ends of Q1 and Q2 separately in the circuit of analog-operation. The oscillating circuit 10 and the pseudo random number output circuit 20A need to be designed satisfying these conditions.

Heretofore, the action of the equality of the smoothing circuit 20 has been explained in full detail.

The smoothing circuit 20 also has the action of disturbing the periodicity in the same system clock data sequence. That is, suppose that there is a random number which passes FIPS140-2 official approval test if the outputs are arranged in a time-sequence. However, the randomness in the same system clock can not fully be obtained simply based on such a random number only by making one bit generated at a certain time into a seed. Then, in the invention, one bit random number data is made by using many bits generated serially. Typically, XOR is calculated for all of the plurality of data.

That is, when time series data is X1, X2, and X3 ... Xn, one bit random number data is made from n time series data by the following formula.

$$W_1 = X_1 \oplus X_2 \oplus X_3 \oplus \ldots X_n \quad (7)$$

This is the method of improving the homogeneity (equality) of the appearance probability of "0" and "1" according to the same effect as what was mentioned above about equality. It turns out that this method also has an effect of raising the randomness in the same system clock data sequence obtained by sampling a plurality of time series data of the same system clock. This point will be explained below.

That is, as mentioned above, when the seed is fixed, the data in the same system clock located in line are always the same in the output data of LFSR. Suppose that the prediction probabilities of the data of the same system clock are f1, f2, and f3 ... fn when the time series data are X1, X2, and X3 ... Xn.

Prediction probability makes appearance probability of "0" and "1" define it as (0.5−fk) here, respectively (0.5+fk). Since all LFSR can be predicted, the following formula is given:

$$fk = \pm 0.5 \, (k=1, 2, \ldots, n) \quad (8)$$

That the same system clock arrangement has random number nature circuit that fk approaches "0", i.e., hard to be predicted.

Two outputs Xj and Xh whose clocks are different from each other are selected, and the XOR of Xj and Xh is set to Xjh.

$$Xjh = X_j \oplus X_h$$

For example, the case where the prediction probability of Xj is "0.4" and the prediction probability of Xh is "0.3" will be considered. When Xj=1, Xh=1 or Xj=0, Xh=1, Xjh becomes "1". Therefore, the probability is 0.9×(1−0.8)+(1−0.9)×0.8=0.26, and the prediction probability fjh is "0.24". That is, the prediction probability fjh of the exclusive OR (XOR) of Xj and Xh is smaller than the prediction probability fj and fh of Xj and Xh. That is, it turns out that the prediction becomes difficult as the exclusive OR is operated. Generally, the prediction probability fjh of the exclusive OR Xjh of Xj and Xh is:

$$fjh = 0.5 - (0.5 + fj)(0.5 - fh) - (0.5 - fj)(0.5 + fh) \quad (9)$$
$$= 2fj \times fh]$$

Since both absolutes of fj and fh have the value smaller than "0.5", that the prediction probability fjh of the exclusive OR Xjh of Xj and Xh is smaller than the prediction probability fj and fh of Xj and Xh can be generally proved. Therefore, the prediction probability of the data sequence in the same system clock becomes smaller, as the number of the time-sequence data for which exclusive OR is operated is increased. As the result, the periodicity in the same system clock data sequence which is sampled with a same system clock from a plurality of time series data can be reduced, and the seed with high quality can be given.

In the above, the smoothing circuit 20 has been explained. Next, the postprocessing circuit 30 is explained.

Figure 5:
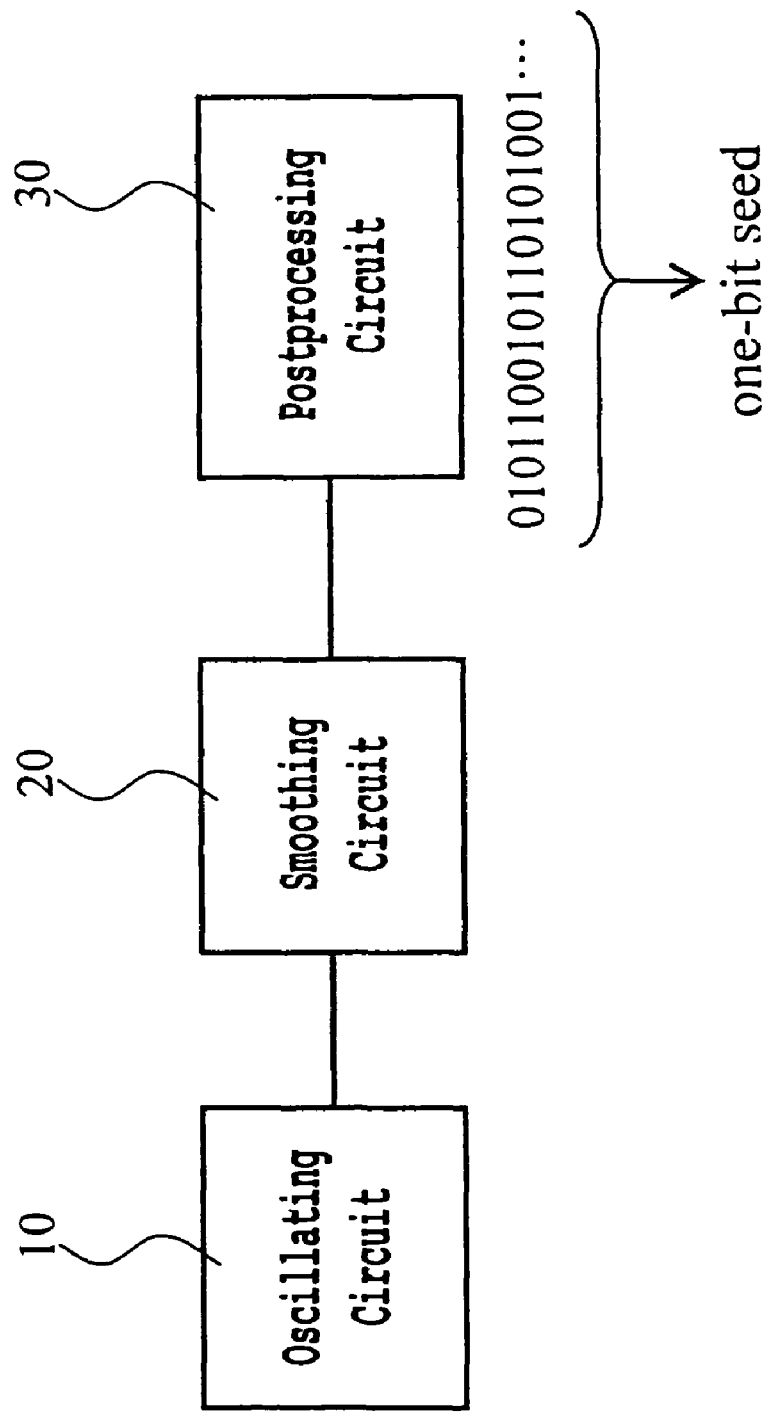
FIG. 5 is a schematic diagram for explaining the action of the postprocessing circuit 30.

FIG. 5 is a schematic diagram for explaining the action of the postprocessing circuit 30. That is, the postprocessing circuit 30 performs computation for the random number sequence outputted from the smoothing circuit 20, and generates one-bit seed. The concrete composition will be explained referring to examples below.

First Example

Figure 6:
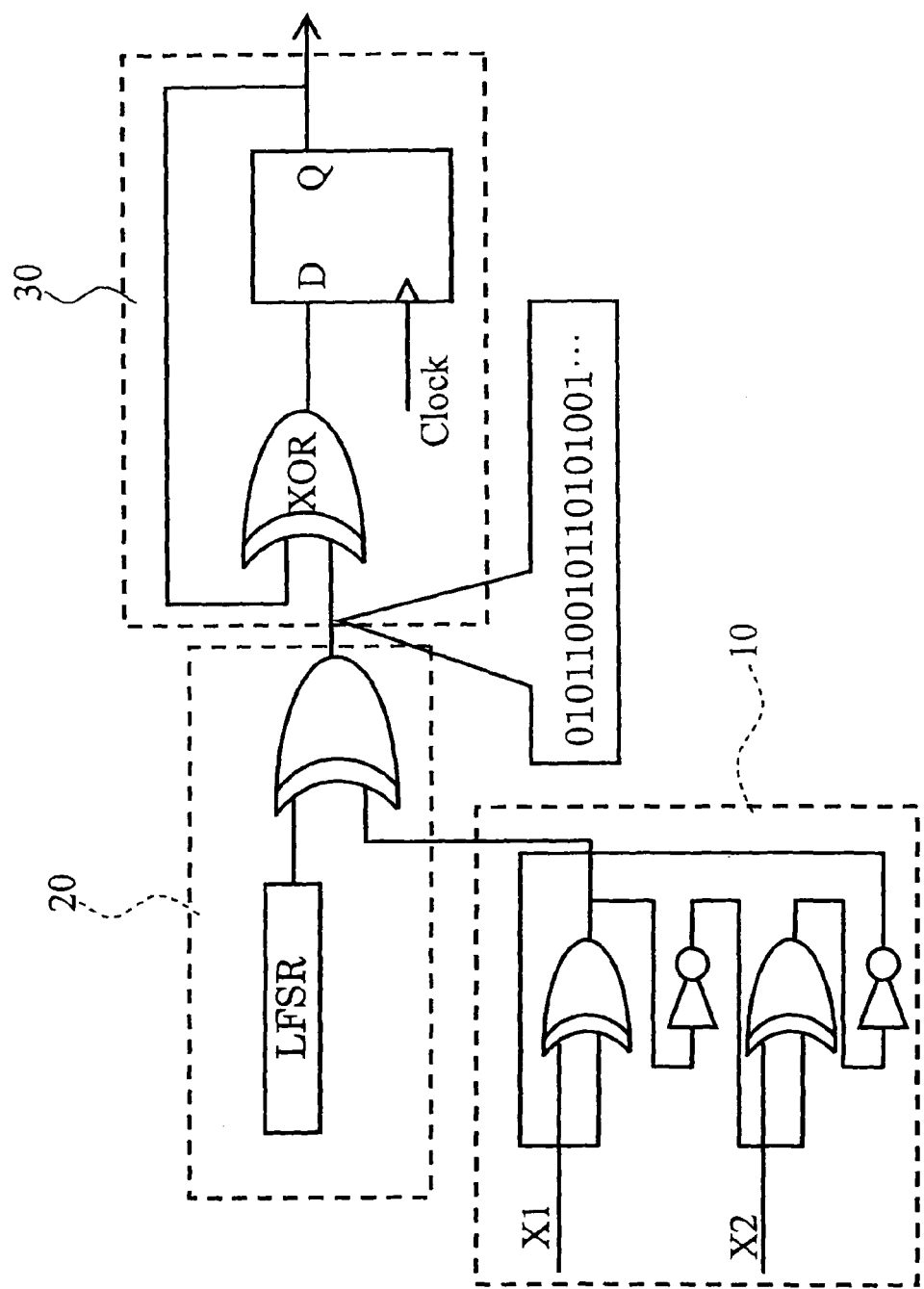
FIG. 6 is a block diagram showing the seed generating circuit according to the first example of the invention.

FIG. 6 is a block diagram showing the seed generating circuit according to the first example of the invention. That is, this seed generating circuit is provided the oscillating circuit 10 expressed in FIG. 2. As mentioned above, this oscillating circuit 10 is the "intermittent oscillating circuit", which carries out the ring oscillation only when the two inputs X1 and X2 are different from each other. And if the case where the two inputs X1 and X2 are the same and the case where the two inputs X1 and X2 are different from each other are half and half, the oscillating circuit 10 oscillates only for the half time of the circuit operation.

On the other hand, the smoothing circuit 20 can be provided with LFSR which has the shift register with thirteen stages as pseudo random number output circuit 20A. The random number sequence illustrated is obtained by calculating XOR of the output of the oscillating circuit 10 and the output of LFSR in the smoothing circuit 20.

On the other hand, the postprocessing circuit 30 generates one-bit seed by calculating XOR of many bits generated serially in this way. If this circuit is operated by n clocks, XOR of time series data of n bits will be outputted to Q.

In the case of the seed generating circuit of this example including some circumference circuits, the required logic gates are about 50 gates, and thus a circuit scale is small. The value fixed to the low level or the high level is inputted as the input X1, and a standard clock is inputted as X2. Thereby, operation which repeats an oscillation (indefinite output) and a definite output by turns is performed. In this case, the clock may synchronize with the clock for other circuits or may not synchronize with them.

The XOR outputs of 20000 of the time series data (same system clock data sequence) for 64 clocks were obtained after producing the seed generating circuit of this example and were applied to statistical official approval test.

Table 1 shows the result of the statistical official approval test.

TABLE 1

| <FIPS140-2> | 2000data | heat-noise amplificatio type | | | pseudo random number (16 stages LFSR) | Present invention | |
|---|---|---|---|---|---|---|---|
| Monobit | 9725 – 10275: 10000 ± 275 | 10059 | ⊚ | x | | 10221 | ○ |
| Run1 | 2315 – 2685: 2500 ± 185 | 2588 2564 | ⊚ | x | | 2584, 2498 | ⊚ |
| Run2 | 1114 – 1368: 1241 ± 127 | 1282 1246 | ⊚ | x | | 1284, 1264 | ⊚ |
| Run3 | 527 – 723: 625 ± 98 | 610, 650 | ⊚ | x | | 593, 595 | ⊚ |
| Run4 | 240 – 384: 312 ± 72 | 302, 327 | ⊚ | x | | 316, 349 | ⊚ |

TABLE 1-continued

| <FIPS140-2> | 2000data | heat-noise amplificatio type | | pseudo random number (16 stages LFSR) | Present invention | |
|---|---|---|---|---|---|---|
| Run5 | 103 – 209: 156 ± 53 | 148, 139 | ⊚ | x | 145, 176 | ⊚ |
| Runover6 | 103 – 209: 156 ± 53 | 144, 148 | ⊚ | x | 120, 160 | ⊚ |
| Poker test | 2.16 < X < 46.17: 24.165 ± 22.005 | 10.22 | ⊚ | x | 20.6336 | ⊚ |
| long run | longest run <26 | | | x | 14, 17 | ⊚ |
| | | | | x | | |
| <General test> | 8000 data | | | x | | |
| square of $\chi$ test | QK > 0.05 | 0.114 | Δ | x | 0.202465 | ○ |
| Run test | Pv > 0.01 | 0.153 | ○ | x | 0.543148 | ⊚ |
| Freq. Test in block | QK > 0.05 | 0.745 | ⊚ | x | 0.217996 | ⊚ |
| Poker Test | QK > 0.05 | 0.272 | ⊚ | x | 0.510356 | ⊚ |
| Serial Cor. Test | −0.022491 < C < 0.02241 | −0.0163 | Δ | x | −0.007205 | ⊚ |
| Gap test;0 | QK > 0.05 | 0.901896 | ⊚ | x | 0.664227 | ⊚ |
| Gap test;1 | QK > 0.05 | 0.19484 | ⊚ | x | 0.591764 | ⊚ |
| Gap test;2 | QK > 0.05 | 0.56847 | ⊚ | x | 0.849706 | ⊚ |
| Gap test;3 | QK > 0.05 | 0.89883 | ⊚ | x | 0.017445 | ⊚ |
| Gap test;4 | QK > 0.05 | 0.849298 | ⊚ | x | 0.220639 | ⊚ |
| Gap test;5 | QK > 0.05 | 0.615556 | ⊚ | x | 0.315313 | ⊚ |
| Gap test;6 | QK > 0.05 | 0.333719 | ⊚ | x | 0.004307 | ⊚ |
| Gap test;7 | QK > 0.05 | 0.629796 | ⊚ | x | 0.466615 | ⊚ |
| Gap test;8 | QK > 0.05 | 0.281213 | ⊚ | x | 0.466615 | ⊚ |
| Gap test;9 | QK > 0.05 | 0.879929 | ⊚ | x | 0.072952 | ○ |
| Gap test;10 | QK > 0.05 | 0.339877 | ⊚ | x | 0.656671 | ⊚ |
| Gap test;11 | QK > 0.05 | 0.57006 | ⊚ | x | 0.633447 | ⊚ |
| Gap test;12 | QK > 0.05 | 0.112747 | ⊚ | x | 0.743529 | ⊚ |
| Gap test;13 | QK > 0.05 | 0.885725 | ⊚ | x | 0.787189 | ⊚ |
| Gap test;14 | QK > 0.05 | 0.080402 | ○ | x | 0.485003 | ⊚ |
| Gap test;15 | QK > 0.05 | 0.747962 | ⊚ | x | 0.931562 | ⊚ |

⊚ passed with leeway (QK > 0.1)
○ passed
Δ▲ passed at border line
x failed

In table 1, the official approval standard FIPS140-2 by technical Standards Division (NIST) and the result of 5% of rejection rate of the general official approval are shown. Moreover, the result when using a physical random number circuit of a heat-noise amplification type and the result obtained from LFSR with 16 stages are also shown in table 1 as comparative examples.

As shown in table 1, it has been confirmed that the high random ability which passes not only official approval test of FIPS140-2 but also more difficult general official approval of 5% of rejection rates is obtained also in the one-bit seed sequence (the same system clock data sequence) of the same system clock, according to the seed generating circuit of this example.

In the case of the physical random number circuit, time series data and the same system clock data sequence are fundamentally the same. On the other hand, in the case of LFSR, since seed is being fixed and the same data are always located in a line in the same system clock data sequence, all official approvals can not be passed as a matter of course.

Figure 7:
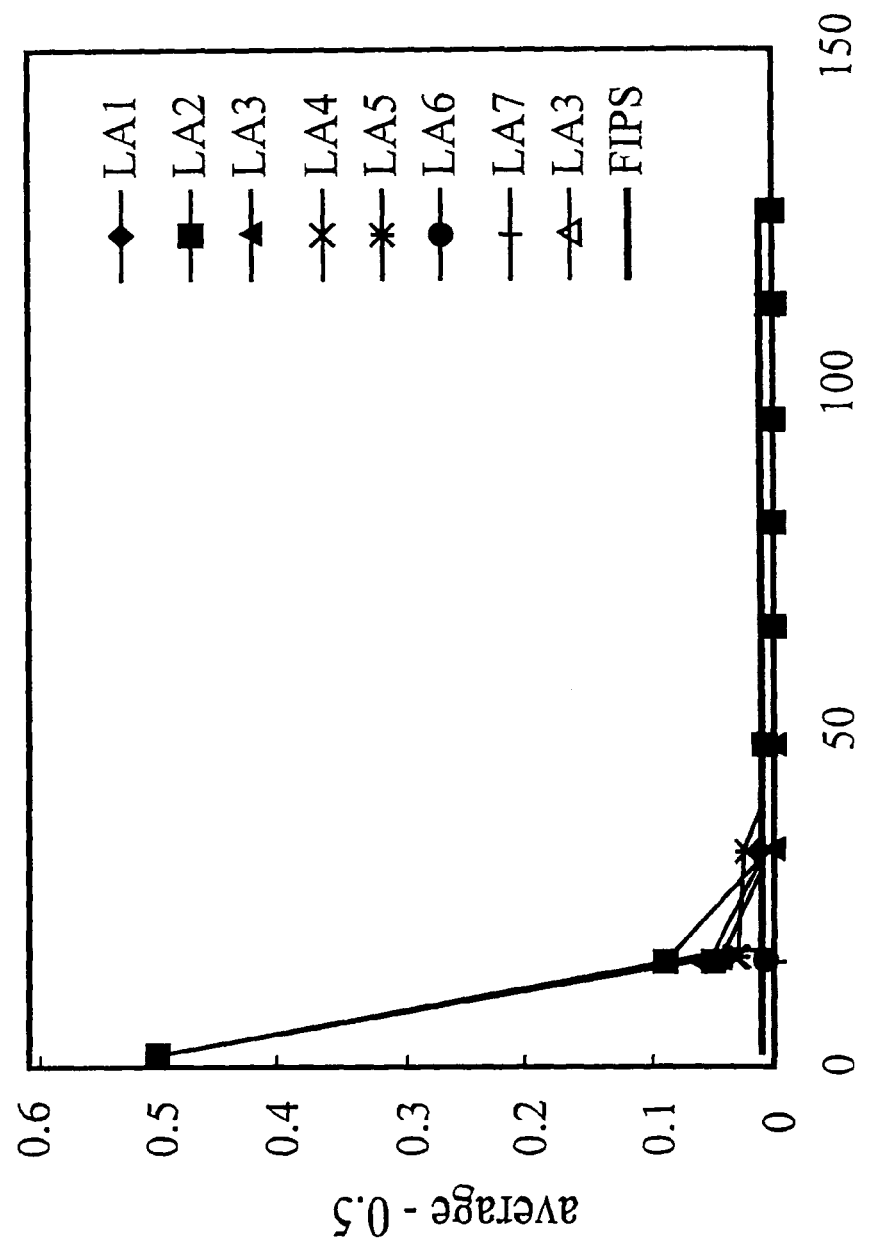
FIG. 7 is a graphical representation which expresses the tendency of an improvement of equality for eight seed generating circuits.

FIG. 7 is a graphical representation which expresses the tendency of an improvement of equality for eight seed generating circuits. That is the equality of each bit of the random number versus the number of the clock after a system startup is shown. From the figure it is understood that the equality is improved as the clocks increases. The consumption current of the oscillating circuit 10 is comparatively large. Therefore, after obtaining the output data with a certain random ability, it is desirable to deliver the data to the smoothing circuit 20 and to stop the oscillating circuit 10.

Second Example

Figure 8:
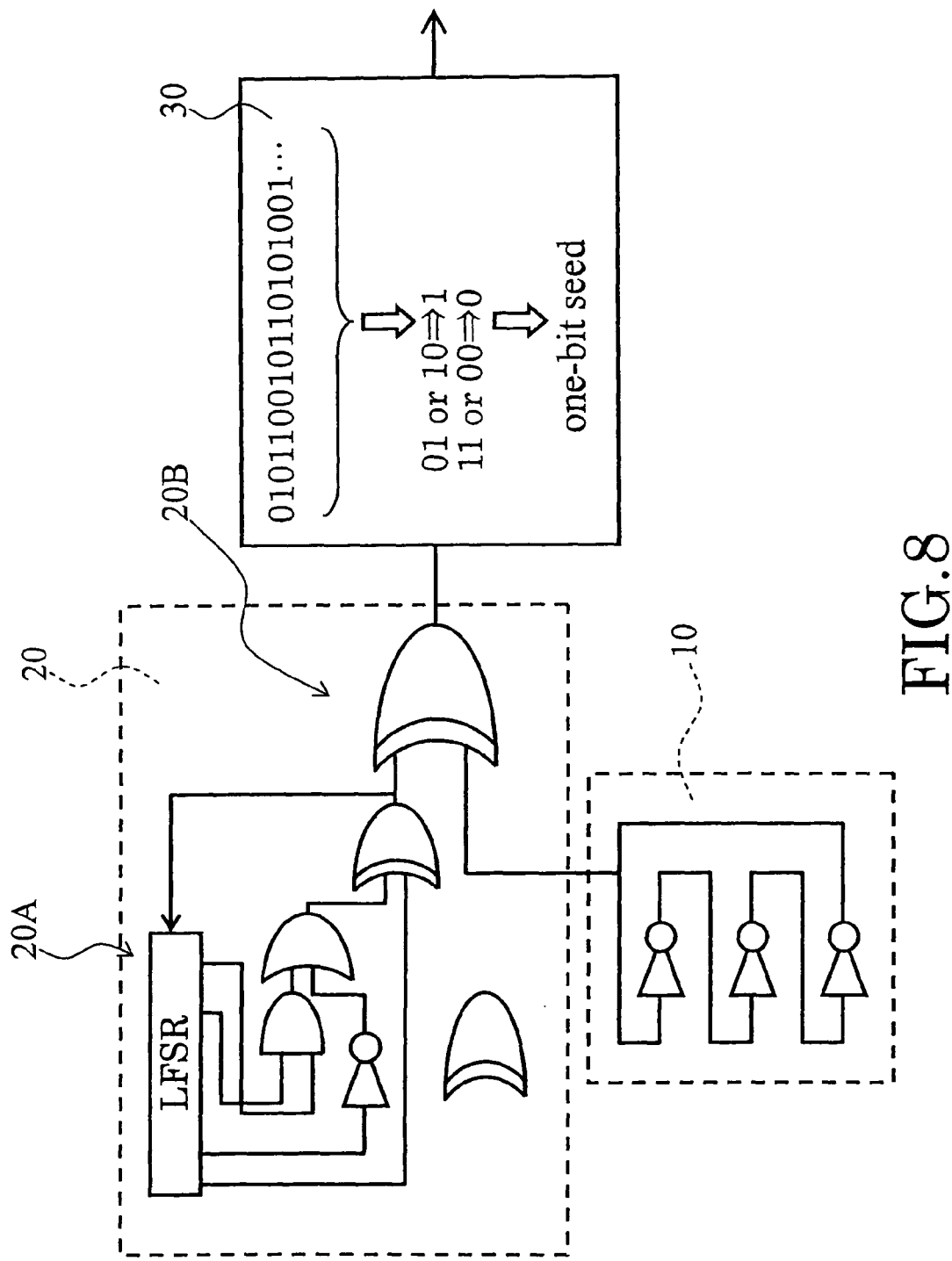
FIG. 8 is a schematic diagram showing the seed generating circuit according to the second example of the invention.

FIG. 8 is a schematic diagram showing the seed generating circuit according to the second example of the invention. In this example, the ring oscillator which expressed in FIG. 3 is used as the oscillating circuit 10. That is, this example is the seed generating circuit in which the "continuous oscillating circuit" is used. In this case, it is desirable for the oscillation frequency of the oscillating circuit to be 10 or more times of the system clock in general. As mentioned above, it is desirable for the ring oscillating circuit of the oscillating circuit 10 to be asynchronous with other circuits.

On the other hand, the smoothing circuit 20 has the pseudo random number generating circuit 20A and the XOR operation media 20B. The pseudo random number generating circuit 20A calculates the logical sum (OR) of the logical product (AND) of the lowest two bits of LFSR which includes 11 stages of shift registers, and an inversion of the one bit of the next column. And then, the pseudo random number generating circuit 20A calculates XOR of the most significant one bit and the OR result. Further, the pseudo random number generating circuit 20A returns the XOR result to the lowest shift register.

The output of the ring oscillator and the output of the pseudo random number generating circuit 20A are calculated in the XOR operation media 20B, and the random data sequence generated in the time-sequence is obtained.

This random data sequence is processed in the postprocessing circuit 30, and 1-bit seed is obtained. When different numbers are obtained in such a way that neighboring two bits are "01" or "10", a conversion process into "1" is performed in the postprocessing circuit 30, as illustrated in the figure. On the other hand, when same numbers are obtained in such a way that neighboring two bits are "11" or "00", a conversion process into "0" is performed in the postprocessing circuit 30, as illustrated. A one-bit seed is generated by repeating this processing until it becomes one bit.

Third Example

Next, the example of transformation of the processing in the postprocessing circuit 30 will be explained as the third example of the invention.

Figure 9:
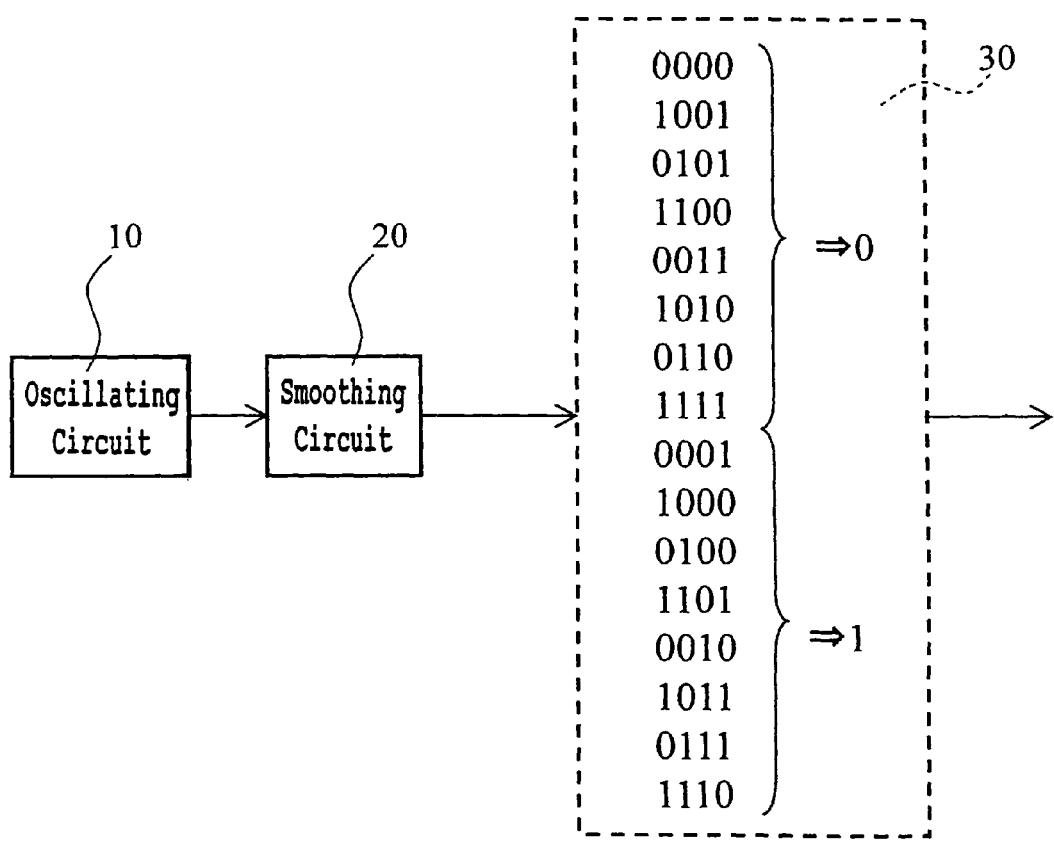
FIG. 9 is a schematic diagram showing the seed generating circuit according to this example.

FIG. 9 is a schematic diagram showing the seed generating circuit according to this example. The multiple of 4, i.e., 4n series data are generated in the smoothing circuit 20 in this example (n is an arbitrary number). The time series data are categorized in terms of every combination of four data in the postprocessing circuit 30 as shown in the figure, respectively, and are converted into "0" or "1." A one bit is made by repeating this process n times.

Thus, the table (conversion table) to convert n bits into one bit is prepared, and by fabricating the conversion circuit for performing the conversion corresponding to this table by using logic circuits, the postprocessing circuit 30 can be realized. Here, the table must be made so that "0" and "1" may be converted out with equal probability. As long as such a condition is filled, any table can be used.

Fourth Example

Next, the random number generating circuit provided the seed generating circuit of the invention will be explained as the fourth example of the invention.

Figure 10:
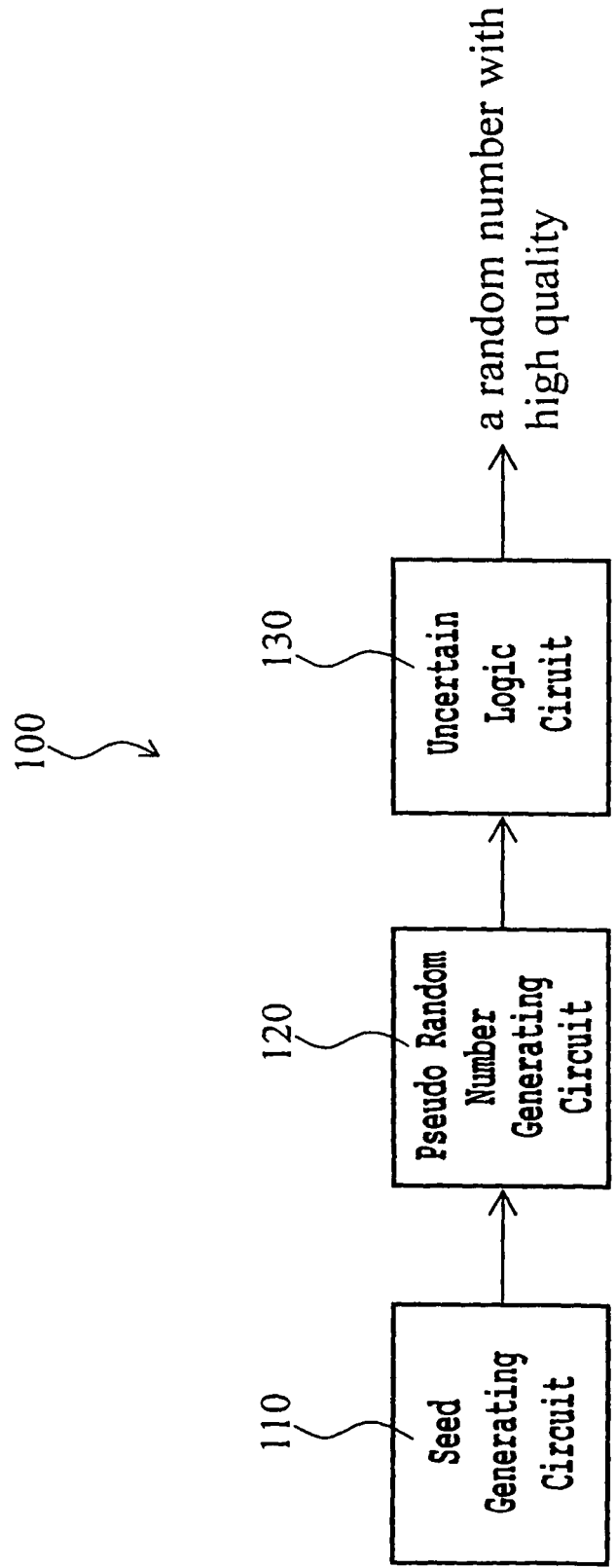
FIG. 10 is a schematic diagram showing the random number generating circuit concerning the example of the invention.

FIG. 10 is a schematic diagram showing the random number generating circuit according to this example. That is, this random number generating circuit 100 has the seed generating circuit 110, the pseudo random number generating circuit 120, and an uncertain logic circuit 130.

The seed generating circuit 110 is a seed generating circuit of the invention which was mentioned above about FIG. 1 through FIG. 9. The pseudo random number generating circuit 120 is a circuit which generates pseudo random numbers using LFSR, for example.

The uncertain logic circuit which the inventors have disclosed in the Japanese patent application No. 2002-183967 can be used as the uncertain logic circuit 130. This circuit gives the digital output value which is not uniquely determined from the digital input value. That is, this circuit has an action that the output of "0" or "1" becomes indefinite to the combination of specific input signals. When the logic output is indefinite, the output is changed by the physical factor of the elements which constitute the uncertain logic circuit 10. By using this physical phenomenon, the digital circuit where the output is changed (becomes indefinite) in response to a specific input is obtained. Thus, the random digital signal sequence of "0" and "1" can be obtained.

In the random number generating circuit 100 of this example, the pseudo random numbers are generated by inputting the seed generated by the seed generating circuit 110 into the pseudo random number generating circuit 120. And the periodicity which the pseudo random number generating circuit 120 has is broken by the uncertain logic circuit 130. As a result, a high quality random number is obtained. If the uncertain logic circuit 130 is united, the circuit scale itself may double, however, the scale is still about at most 1000 gates. Therefore, the circuit can be provided in IC (semiconductor integrated circuit), a chip for IC cards, a small personal digital assistant, etc. as will be explained in full detail below.

The Fifth Example

Next, the semiconductor integrated circuit (IC) provided the seed generating circuit of the invention will be explained as the fifth example of the invention.

Figure 11:
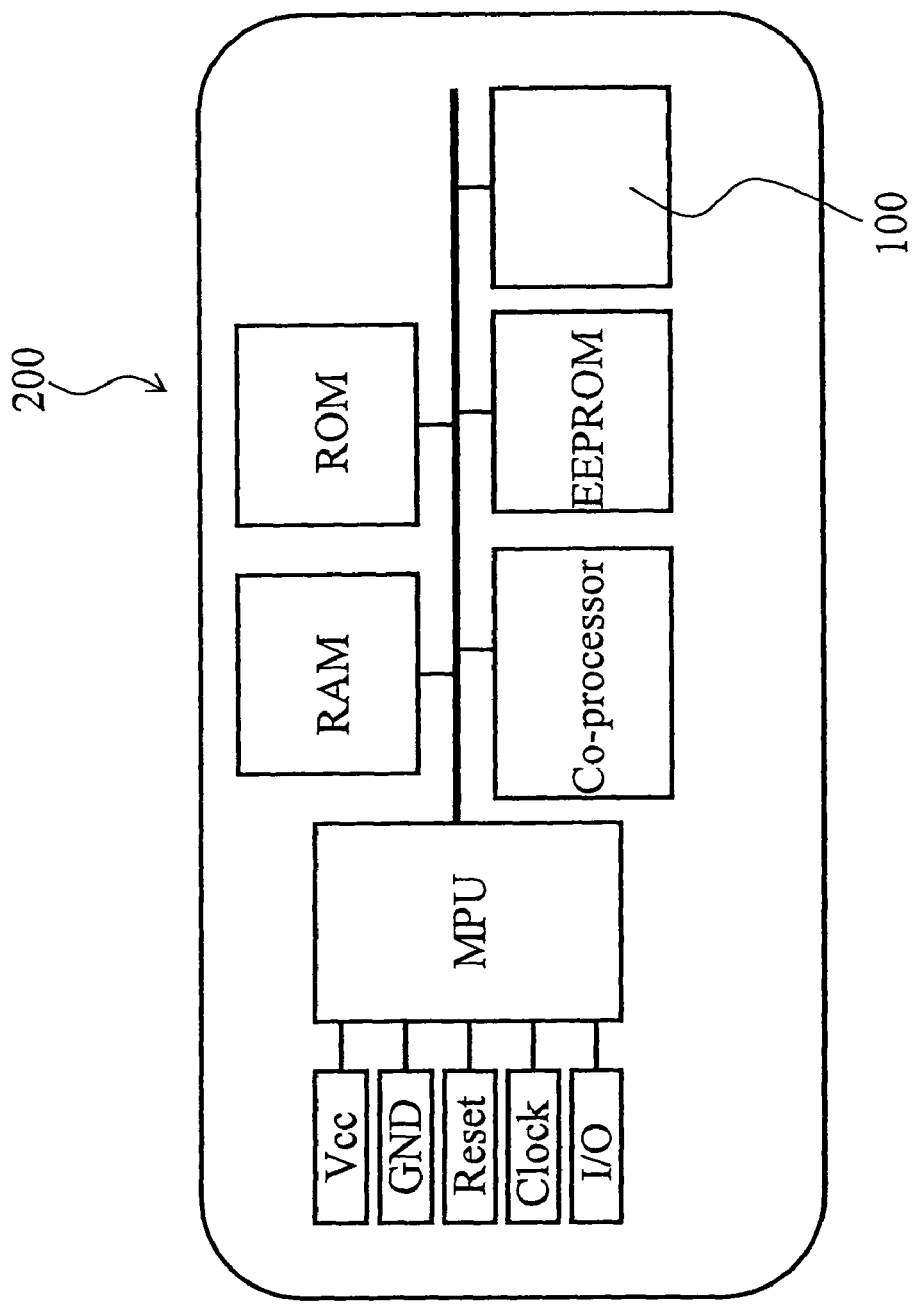
FIG. 11 is a schematic diagram showing the composition of the principal part of the semiconductor integrated circuit of the example of the invention.

FIG. 11 is a schematic diagram showing the composition of the principal part of the semiconductor integrated circuit of this example. This example is IC capable of being mounted on an IC card etc. The IC has an operation part (MPU), a memory (RAM, ROM and/or EEPROM), an auxiliary operation part (co-processor), and the random number generating circuit 100. Here, the auxiliary operation part (co-processor) has the role of performing scrambling.

The high quality random number can be obtained by combining the seed generating circuit of the invention and a usual pseudo random number generating circuit, etc. in the random number generating circuit 100. Mounting this random number generating circuit 100 enables the operation part (MPU) and the auxiliary operation part (Co-processor) only for scrambling to always read and use the high quality random number. Moreover, mounting this random number generating circuit 100 also makes it possible to disturb change of consumption current using the random number for a measure on the hacking technology which the encryption key is read by the consumption current signal of IC. As a result, advanced code security becomes realizable.

Figure 12:
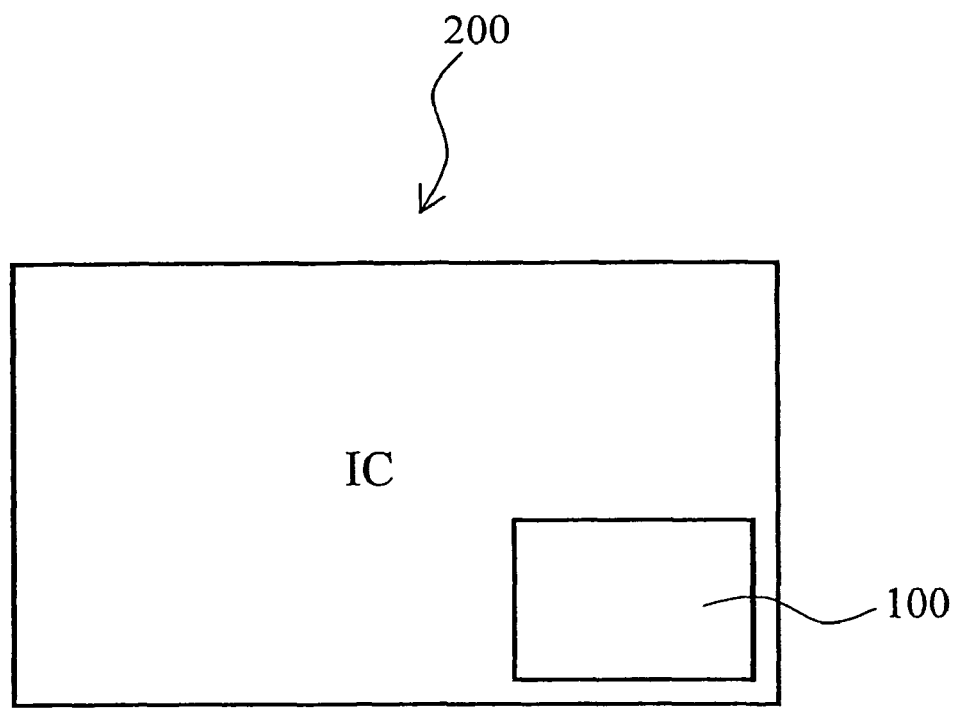
FIG. 12 is a schematic diagram for explaining the scale of the circuit of the semiconductor integrated circuit 200 of the example of the invention.

FIG. 12 is a schematic diagram for explaining the scale of the circuit of the semiconductor integrated circuit 200 of this example. Namely, the random number generating circuit 100 which has a combination of the seed generating circuit of the invention and the usual pseudo random number generating circuit etc. can consist of only CMOS logic circuits. And the random number generating circuit 100 can be mounted in various kinds of ICs because it requires only about 100 logic gates. The scale of the circuit is equal to or less than the scale illustrated in FIG. 12, therefore, it does not increase the size of the whole IC sharply.

By providing the random number generating circuit of the invention, the advanced code security function can be offered. Moreover, the advanced code security function can be also used for the random number for a game machine or for Monte Carlo simulation.

The Sixth Example

Next, the IC card and the portable information terminal equipment on which the random number generating circuits of the invention are mounted are explained as the sixth example of the invention.

Figure 13:
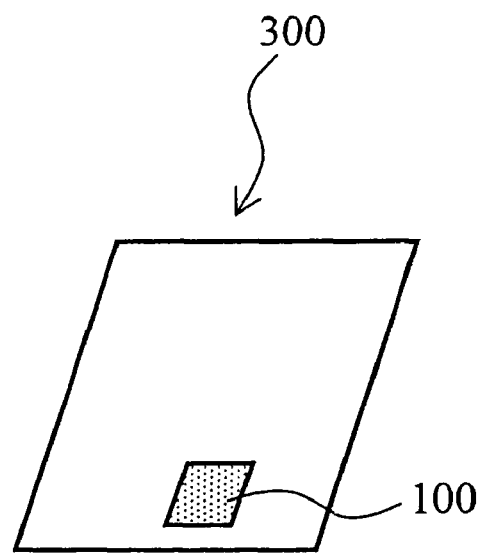
FIG. 13 is a schematic diagram showing the IC card and information terminal equipment of the example of the invention.

FIG. 13 is a schematic diagram showing the IC card and information terminal equipment of this example. In this figure, reference numeral 300 expresses the IC card or information terminal equipment of this example. As the IC card, the deposit card of a bank, various kinds of prepaid cards, the employee ID card in a company, a gate security card, etc. can be mentioned, for example. Moreover, as the information terminal equipment, a cellular phone and other portable terminals can be mentioned, for example. As such a portable terminal, the terminal provided one of various kinds of functions, such as a word processor, a spreadsheet software, a scheduler, a game, transmission and reception of E-mail, photography of a still picture or a moving picture, can be mentioned, for example.

Figure 14:
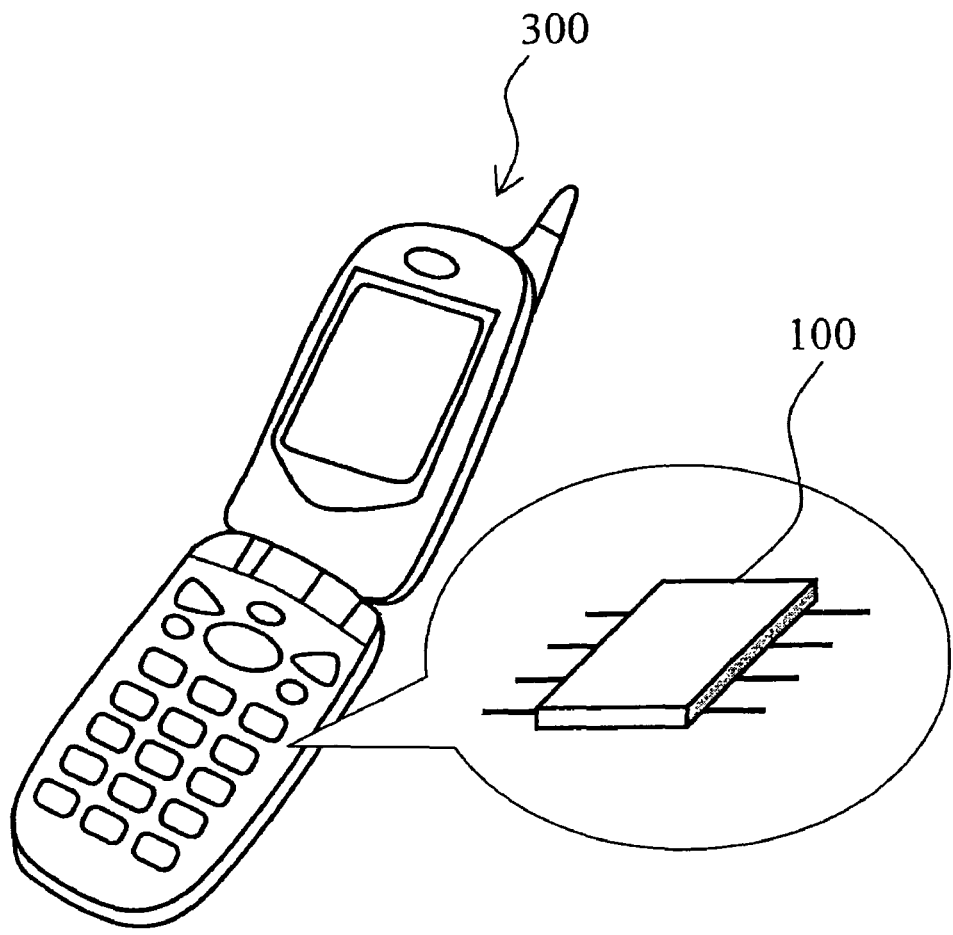
FIG. 14 shows a portable telephone as an information terminal equipment of the invention.
Figure 15:
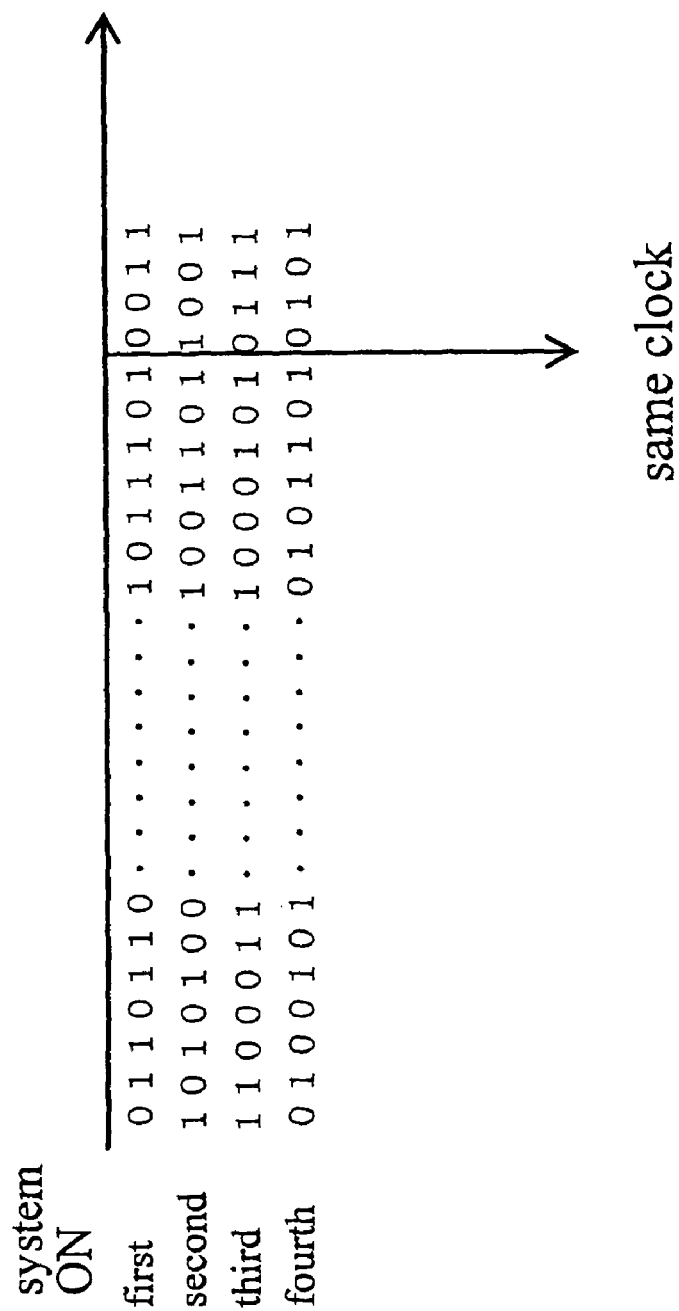
FIG. 15 is a schematic diagram for explaining the situation that a random number with high quality cannot be obtained by using the pseudo random number generating circuit.
Figure 16A:
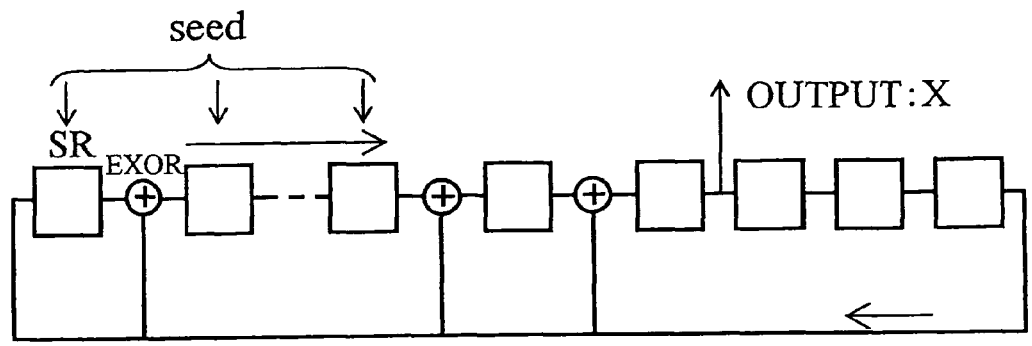
FIG. 16A through FIG. 16C are schematic diagrams for explaining a role of the seed in the pseudo random number circuit.
Figure 16B:
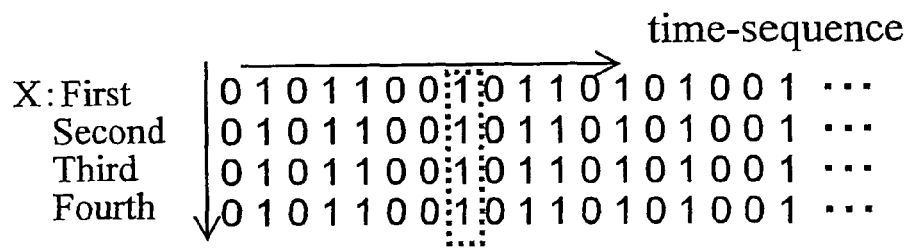
Figure 16C:
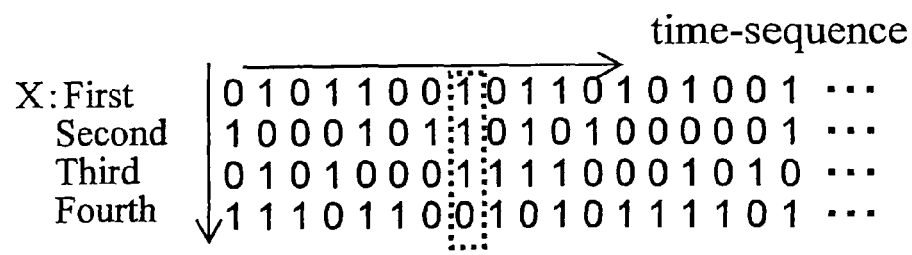

For example, also in the cellular phone 300 expressed in FIG. 14, the random number generating circuit 100 of the invention can be provided. Moreover, also in the similar personal digital assistant, the random number generating circuit 100 of the invention can be provided.

According to the invention, an advanced code security function can be added by providing the random number generating circuit 100 which combines the seed generating circuit and the usual pseudo random number generating circuit etc., while keeping the size of the system very small and the power consumption very small. That is, the random number generating circuit 100 of the embodiment can used for a user's authentication process, encryption of data, decryption of data, game function, and for the generation of a random number for Monte Carlo simulation.

Heretofore, the embodiments of the present invention have been explained, referring to the examples. However, the present invention is not limited to these specific examples.

For example, the concrete composition of the oscillating circuit, the smoothing circuit, the postprocessing circuit, the pseudo random number generating circuit, and the indefinite logic circuit used in the invention are not limited to the abovementioned specific examples, but may be replaced by all of the circuits having same functions and actions as the present invention.

For example, the logic circuit in which a plurality of flip-flop with indefinite outputs is arranged in parallel or in series can also be used as the pseudo random number generating circuit.

Moreover, although the digital random number made by the random number generating circuit of the invention can also be used as it is, it can also generate a new random number by being used as a seed of a feedback shift register.

While the present invention has been disclosed in terms of the embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A random number generating circuit, comprising:
a seed generating circuit configured to generate a seed; and
a pseudo random number circuit configured to generate pseudo random numbers based on the seed generated by the seed generating circuit,
the seed generating circuit including:
   an oscillating circuit configured to oscillate continuously or intermittently, and output a digital data sequence;
   a smoothing circuit configured to output time series data by controlling appearance frequencies of "0" and "1" in the digital data sequence outputted from the oscillating circuit; and
   a postprocessing circuit configured to generate one-bit seed by a computation using a plurality of bits included in the time series data, wherein
the oscillating circuit has a first exclusive OR computing circuit, a first inverter circuit, a second exclusive OR computing circuit, and a second inverter circuit, coupled in series in this order,
data are given to one of input ends of the first exclusive OR computing circuit and to one of input ends of the second exclusive OR computing circuit, respectively,
the oscillating circuit oscillates when the data inputted to the first and second exclusive OR computing circuits have a specific combination, and
appearance frequencies of "0" and "1" outputted from the smoothing circuit are more close to 1:1 than appearance frequencies of "0" and "1" in the digital data sequence outputted from the oscillating circuit.

2. A random number generating circuit, comprising:
a seed generating circuit configured to generate a seed; and
a pseudo random number circuit configured to generate pseudo random numbers based on the seed generated by the seed generating circuit,
the seed generating circuit including:
   an oscillating circuit configured to oscillate continuously or intermittently, and to output a digital data sequence;
   a smoothing circuit configured to output time series data by controlling appearance frequencies of "0" and "1" in the digital data sequence outputted from the oscillating circuit; and
   a postprocessing circuit configured to generate one-bit seed by a computation using a plurality of bits included in the time series data, wherein
the oscillating circuit has a first exclusive OR computing circuit, a first inverter circuit, a second exclusive OR computing circuit, and a second inverter circuit, coupled in series in this order,
data are given to one of input ends of the first exclusive OR computing circuit and to one of input ends of the second exclusive OR computing circuit, respectively,
the oscillating circuit oscillates when the data inputted to the first and second exclusive OR computing circuits have a specific combination, and
the postprocessing circuit generates the one-bit seed based on a table which assigns either "0" and "1" corresponding to a combination of the plurality of bits.

3. A semiconductor integrated circuit, comprising:
a random number generating circuit including:
a seed generating circuit configured to generate a seed; and
a pseudo random number circuit configured to generate pseudo random numbers based on the seed generated by the seed generating circuit,
the seed generating circuit including:
   an oscillating circuit configured to oscillate continuously or intermittently, and to output a digital data sequence;
   a smoothing circuit configured to output time series data by controlling appearance frequencies of "0" and "1" in the digital data sequence outputted from the oscillating circuit; and
   a postprocessing circuit configured to generate one-bit seed by a computation using a plurality of bits included in the time series data, wherein
the oscillating circuit has a first exclusive OR computing circuit, a first inverter circuit, a second exclusive OR computing circuit, and a second inverter circuit, coupled in series in this order,
data are given to one of input ends of the first exclusive OR computing circuit and to one of input ends of the second exclusive OR computing circuit, respectively,
the oscillating circuit oscillates when the data inputted to the first and second exclusive OR computing circuits have a specific combination, and
appearance frequencies of "0" and "1" outputted from the smoothing circuit are more close to 1:1 than appearance frequencies of "0" and "1" in the digital data sequence outputted from the oscillating circuit.

4. A semiconductor integrated circuit, comprising:
a random number generating circuit including:
a seed generating circuit configured to generate a seed; and
a pseudo random number circuit configured to generate pseudo random numbers based on the seed generated by the seed generating circuit,
the seed generating circuit including:
an oscillating circuit configured to oscillate continuously or intermittently, and to output a digital data sequence;
a smoothing circuit configured to output time series data by controlling appearance frequencies of "0" and "1" in the digital data sequence outputted from the oscillating circuit; and
a postprocessing circuit configured to generate one-bit seed by a computation using a plurality of bits included in the time series data, wherein
the oscillating circuit has a first exclusive OR computing circuit, a first inverter circuit, a second exclusive OR computing circuit, and a second inverter circuit, coupled in series in this order,
data are given to one of input ends of the first exclusive OR computing circuit and to one of input ends of the second exclusive OR computing circuit, respectively,
the oscillating circuit oscillates when the data inputted to the first and second exclusive OR computing circuits have a specific combination, and
the postprocessing circuit has an exclusive OR computing circuit which performs the computation.

5. A semiconductor integrated circuit, comprising:
a random number generating circuit including:
a seed generating circuit configured to generate a seed; and
a pseudo random number circuit configured to generate pseudo random numbers based on the seed generated by the seed generating circuit,
the seed generating circuit including:
an oscillating circuit configured to oscillate continuously or intermittently, and to output a digital data sequence;
a smoothing circuit configured to output time series data by controlling appearance frequencies of "0" and "1" in the digital data sequence outputted from the oscillating circuit; and
a postprocessing circuit configured to generate one-bit seed by a computation using a plurality of bits included in the time series data, wherein
the oscillating circuit has a first exclusive OR computing circuit, a first inverter circuit, a second exclusive OR computing circuit, and a second inverter circuit, coupled in series in this order,
data are given to one of input ends of the first exclusive OR computing circuit and to one of input ends of the second exclusive OR computing circuit, respectively,
the oscillating circuit oscillates when the data inputted to the first and second exclusive OR computing circuits have a specific combination, and
the postprocessing circuit generates the one-bit seed based on a table which assigns either "0" and "1" corresponding to a combination of the plurality of bits.

6. An integrated circuit (IC) card, comprising:
a semiconductor integrated circuit including a random number generating circuit which includes:
a seed generating circuit configured to generate a seed; and
a pseudo random number circuit configured to generate pseudo random numbers based on the seed generated by the seed generating circuit,
the seed generating circuit including:
an oscillating circuit configured to oscillate continuously or intermittently, and which outputs a digital data sequence;
a smoothing circuit configured to output time series data by controlling appearance frequencies of "0" and "1" in the digital data sequence outputted from the oscillating circuit; and
a postprocessing circuit configured to generate one-bit seed by a computation using a plurality of bits included in the time series data, wherein
the oscillating circuit has a first exclusive OR computing circuit, a first inverter circuit, a second exclusive OR computing circuit, and a second inverter circuit, coupled in series in this order,
data are given to one of input ends of the first exclusive OR computing circuit and to one of input ends of the second exclusive OR computing circuit, respectively,
the oscillating circuit oscillates when the data inputted to the first and second exclusive OR computing circuits have a specific combination, and
the smoothing circuit includes:
a pseudo random number generating circuit configured to generate pseudo random numbers; and
a logical operation circuit configured to calculate an exclusive OR of the digital data sequence outputted from the oscillating circuit and the pseudo random numbers generated by the pseudo random number generating circuit.

7. An integrated circuit (IC) card, comprising:
a semiconductor integrated circuit including a random number generating circuit which includes:
a seed generating circuit configured to generate a seed; and
a pseudo random number circuit configured to generate pseudo random numbers based on the seed generated by the seed generating circuit,
the seed generating circuit including:
an oscillating circuit configured to oscillate continuously or intermittently, and to output a digital data sequence;
a smoothing circuit configured to output time series data by controlling appearance frequencies of "0" and "1" in the digital data sequence outputted from the oscillating circuit; and
a postprocessing circuit configured to generate one-bit seed by a computation using a plurality of bits included in the time series data, wherein
the oscillating circuit has a first exclusive OR computing circuit, a first inverter circuit, a second exclusive OR computing circuit, and a second inverter circuit, coupled in series in this order,
data are given to one of input ends of the first exclusive OR computing circuit and to one of input ends of the second exclusive OR computing circuit, respectively,
the oscillating circuit oscillates when the data inputted to the first and second exclusive OR computing circuits have a specific combination, and
appearance frequencies of "0" and "1" outputted from the smoothing circuit are more close to 1:1 than appearance frequencies of "0" and "1" in the digital data sequence outputted from the oscillating circuit.

8. An integrated circuit (IC) card, comprising:
a semiconductor integrated circuit including a random number generating circuit which includes:
a seed generating circuit configured to generate a seed; and
a pseudo random number circuit configured to generate pseudo random numbers based on the seed generated by the seed generating circuit, the seed generating circuit including:
an oscillating circuit configured to oscillate continuously or intermittently, and to output a digital data sequence;
a smoothing circuit configured to output time series data by controlling appearance frequencies of "0" and "1" in the digital data sequence outputted from the oscillating circuit; and
a postprocessing circuit configured to generate one-bit seed by a computation using a plurality of bits included in the time series data, wherein
the oscillating circuit has a first exclusive OR computing circuit, a first inverter circuit, a second exclusive OR computing circuit, and a second inverter circuit, coupled in series in this order,
data are given to one of input ends of the first exclusive OR computing circuit and to one of input ends of the second exclusive OR computing circuit, respectively,
the oscillating circuit oscillates when the data inputted to the first and second exclusive OR computing circuits have a specific combination, and
the postprocessing circuit generates the one-bit seed based on a table which assigns either "0" and "1" corresponding to a combination of the plurality of bits.

9. An information terminal equipment, comprising:
a semiconductor integrated circuit including a random number generating circuit which includes:
a seed generating circuit configured to generate a seed; and
a pseudo random number circuit configured to generate pseudo random numbers based on the seed generated by the seed generating circuit,
the seed generating circuit including:
an oscillating circuit configured to oscillate continuously or intermittently, and to output a digital data sequence;
a smoothing circuit configured to output time series data by controlling appearance frequencies of "0" and "1" in the digital data sequence outputted from the oscillating circuit; and
a postprocessing circuit configured to generate one-bit seed by a computation using a plurality of bits included in the time series data, wherein
the oscillating circuit has a first exclusive OR computing circuit, a first inverter circuit, a second exclusive OR computing circuit, and a second inverter circuit, coupled in series in this order,
data are given to one of input ends of the first exclusive OR computing circuit and to one of input ends of the second exclusive OR computing circuit, respectively,
the oscillating circuit oscillates when the data inputted to the first and second exclusive OR computing circuits have a specific combination, and
appearance frequencies of "0" and "1" outputted from the smoothing circuit are more close to 1:1 than appearance frequencies of "0" and "1" in the digital data sequence outputted from the oscillating circuit.

10. An information terminal equipment, comprising:
a semiconductor integrated circuit including a random number generating circuit which includes:
a seed generating circuit configured to generate a seed; and
a pseudo random number circuit configured to generate pseudo random numbers based on the seed generated by the seed generating circuit,
the seed generating circuit including:
an oscillating circuit configured to oscillate continuously or intermittently, and to output a digital data sequence;
a smoothing circuit configured to output time series data by controlling appearance frequencies of "0" and "1" in the digital data sequence outputted from the oscillating circuit; and
a postprocessing circuit configured to generate one-bit seed by a computation using a plurality of bits included in the time series data, wherein
the oscillating circuit has a first exclusive OR computing circuit, a first inverter circuit, a second exclusive OR computing circuit, and a second inverter circuit, coupled in series in this order,
data are given to one of input ends of the first exclusive OR computing circuit and to one of input ends of the second exclusive OR computing circuit, respectively,
the oscillating circuit oscillates when the data inputted to the first and second exclusive OR computing circuits have a specific combination, and
the postprocessing circuit generates the one-bit seed based on a table which assigns either "0" and "1" corresponding to a combination of the plurality of bits.

\* \* \* \* \*